United States Patent
Nlebedim et al.

(10) Patent No.: US 12,374,733 B2
(45) Date of Patent: Jul. 29, 2025

(54) LITHIUM RECOVERY VIA CHARGING OF LITHIUM-ION BATTERIES

(71) Applicant: Iowa State University Research Foundation, Inc., Ames, IA (US)

(72) Inventors: Cajetan Ikenna Nlebedim, Ames, IA (US); Abhishek Sarkar, Ames, IA (US); Pranav Shrotriya, Ames, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 447 days.

(21) Appl. No.: 17/803,423

(22) Filed: Jun. 30, 2022

(65) Prior Publication Data
US 2023/0020052 A1  Jan. 19, 2023

Related U.S. Application Data
(60) Provisional application No. 63/259,303, filed on Jul. 6, 2021.

(51) Int. Cl.
*H01M 10/54* (2006.01)
*C01B 32/215* (2017.01)
*C25C 5/02* (2006.01)

(52) U.S. Cl.
CPC .......... *H01M 10/54* (2013.01); *C01B 32/215* (2017.08); *C25C 5/02* (2013.01)

(58) Field of Classification Search
USPC ...................................................... 423/179.5
See application file for complete search history.

(56) References Cited

U.S. PATENT DOCUMENTS 5,352,270 A * 10/1994 Shackle ................. C22B 7/006
 423/68
2024/0006675 A1 * 1/2024 Tanim ..................... H01M 10/48

OTHER PUBLICATIONS

Liu et al, Understanding undesirable anode lithium plating issues in lithium-ion batteries, RCS Advances, vol. 6, Issue 91, Sep. 2016, pp. 88683-88700 (Year: 2016).*
Zhang et al, Effective regeneration of anode material recycled from scrapped Li-ion batteries, Journal of Power Sources, vol. 390, Jun. 2018, pp. 38-44 (Year: 2018).*
(Continued)

*Primary Examiner* — Harry D Wilkins, III (57) ABSTRACT

An efficient and green method for selective extraction of Li from end-of-life secondary LIBs of any capacity and size is provided. Electrochemical driven selective lithium deposition is targeted at the anode/separator interface of the end-of-life LIB. The deposited Li is recovered by processing of an opened or dismantled battery using only distilled or de-ionized water. The process not only enables the recovery of the plated lithium at the anode/separator interface, but also extracts the lithium from the organic salts and/or inorganic salts in the solid electrolyte interface (SEI) layers and from the electrolyte in the separator. In addition, the method partially strips the cyclable Li from the cathode and concentrates it at the anode/separator interface. The concentrated Li is extracted by using aqueous solution such as distilled or de-ionized water followed by recovery of the Li from aqueous solution. After Li recovery from the anode, the method can also enable the recovery of battery-grade graphite.

16 Claims, 7 Drawing Sheets

(56) References Cited

OTHER PUBLICATIONS

Zhang et al, Appendix to Effective regeneration of anode material recycled from scrapped Li-ion batteries, Journal of Power Sources, vol. 390, Jun. 2018, pp. 1-5 (Year: 2018).*
Lei et al, Lithium ion battery recycling using high-intensity ultrasonication, Green Chemistry, vol. 23, Jun. 2021, pp. 4710-4715 ( Year: 2021).*
Sarkar et al., Electrochemical-driven green recovery of lithium, graphite and cathode from lithium-ion batteries using water, Waste Management, vol. 150, Aug. 2022, pp. 320-327 (Year: 2022).*
M.C. Smart et al., Effects of Electrolyte Composition on Lithium Plating in Lithium-Ion Cells, J. of The Electrohemial Society, 158, pp. A379-A389, 2011.
S. Castillo et al., Advances in recovery of spent lithium battery compounds, J. of Power Sources, 112, pp. 247-254, 2002.
M. Petel et al., Nondestrucutive detection, characterization and quantitifcation of lithium plating in commercial lithium-ion batteries. J. of Power Sources, 254, pp. 80-87, 2014.
J.M. Tarascon et al., Issues and challenges facing rechargeable lithium batteries, Nature, vol. 414, pp. 359-367, Jul. 2005.
J. Dewulf et al., Recycling rechargeable lithium ion batteries, Critical analysis of natural resource savings, Resources, Conservation and Recycling, 54, pp. 229-234, 2010.
M. Armand et al., Building better batteries, Nature, vol. 451, pp. 652-657, 2008.
Ali Eftekhari, Lithium Batteries for Electric Vehicles: From Economy to Research Strategy, ACS Sustainable Chemistry Chem. Eng., 7, 2019.
J.B. Dunn et al, Material and Energy Flows in the Materials Production, Asssembly, and End-of-Life Stages of the Automotive Lithium-Ion Battery Life Cycle, ANL/ESD/12-3,2012.
Thomas E. Graedel, Recycling Rates of Metals, A Status Report, International Resource Panel, 2011.
Basudev Swain, Recovery and recycling of lithium: A review, Separation and Purification Technolohy, 172, pp. 388-403, 2017.
Takuma Watari et al, Review of critical metal dynamics to 2050 for 48 elements, Resources, Conservation & Recycling, 155, 104669, 2020.
Hans Eric Melin et al, State-of-the-art in reuse and recycling of lithium-ion batteries—A research review, Commisioned by The Swedish Energy Agency, 2019.
Daniel Oberhaus, The Race to Crack Battery Recycling-Before It's Too Late, Science, 2020.
Alessio Miatto et al, The rise and fall of American lithium, Resources, Conservation & Recycling, 162, 105034, 2020.
Peter Griem et al, Assessment of lithium criticality in the global energy transition and addressing policy gaps in transportation, Nature Communications, 11:4570, 2020.
BU-103:Global Battery Markets, https://batteryuniversity.com/article/bu-103-global-battery-markets.
Darlene Steward et al, Economics and Challenges of Li-Ion Battery Recycling from End-of-Life Vehicles, Procedia Manufacturing, 33, 272-279, 2019.
Carl A. Williams, Global lithium demand expected to double by 2024, mining.com, The Battery Materials Digest, 2023.
Alexandre Beaudet et al, Key Challenges and Opportunities for Recycling Electric Vehicle Battery Materials, Sustainablity, 12, 5837, 2020.

\* cited by examiner

| Elements | Atomic Concentration (%) | |
|---|---|---|
| | Graphite (pre-HT) | Graphite (post-HT) |
| Li1s | 0.00 | 0.00 |
| C1s | 89.88 | 96.76 |
| N1s | 0.71 | 0.02 |
| O1s | 8.43 | 2.83 |
| F1s | 0.36 | 0.39 |
| P2P | 0.17 | 0.00 |
| S2p | 0.46 | 0.00 |

Fig. 12

| Element | Conc. (ppm) | At conc. % |
|---|---|---|
| Li | 0.764 | 7.77 |
| Co | 9.064 | 92.3 |

LITHIUM RECOVERY VIA CHARGING OF LITHIUM-ION BATTERIES

CONTRACTUAL ORIGIN OF THE INVENTION

This invention was made with government support under Grant No. DE-AC-02-07CH11358 awarded by the U.S. Department of Energy. The government has certain rights in the invention.

FIELD OF THE INVENTION

The present invention relates to a green recovery method for extracting and recovering lithium and other critical elemental constituents of end-of-life Li-ion batteries.

BACKGROUND OF THE INVENTION

Lithium represent about 37% of the rechargeable battery market with the highest product life and nearly 100% cycling efficiency compared to any other energy storage solution. The global demand for cleaner transportation targets a significant future prospect for lithium battery in the electrification of vehicles. Lithium batteries consume more than 39% of the available lithium reserve with 5-7 wt. % of lithium in an LIB. This creates a high pressure on the available natural resources. The global demand for lithium metal is targeted to increase from 47,300 tons in 2020 to 117,400 tons by 2024 (about 150% increment). By 2030, the global LIB production will hit 2 million tons/year.

With the present technological advancements, the cost of lithium recovery far exceeds that of manufacturing batteries from natural resources. The challenge is involved in the ability to recover the critical elements from the battery and reintroduce them as high-quality battery-grade products at competitive price to the raw materials. A survey study by the Swedish Energy Agency established that the cost of recycling lithium is thrice that of lithium from natural reserves. The USGS reported a global production of 77,000 tons of lithium in 2019, at which rate the production of LIB would be bottlenecked. Although LIBs consume more than 39% of the available lithium reserve, only 5% of the used batteries are recycled in the US. Of the small fraction being recycled, the primary focus is on the recovery of Co, Ni and other critical transition metals, while <1% of lithium is recycled. With the current trend of lithium recovery, the metal will become critical in the very near future.

The two industrial approaches towards recycling of lithium batteries are pyrometallurgical and hydrometallurgical. Pyrometallurgical recycling process is the most common, and typically extracts the aluminum, copper, and transition metals like cobalt, nickel, and manganese, from the batteries. However, this process incinerates the graphite and the lithium is lost in the effluent slag as lithium hydroxide/oxide. The energy cost and the carbon footprint from operating the furnace makes the process inefficient. The hydrometallurgical process involves dissolving the spent cathode of LIBs in strong acids, followed by a selective extraction of the individual components. Lithium extraction occurs as the last step in the acid leaching process via co-precipitation. This condition makes the lithium recoverability inefficient in small scale applications, where the starting material mass is in grams rather than kilograms. The hydrometallurgical method poses environmental concerns due to chemical toxicity and additional expenditure from the setup of waste effluent treatment plants. Furthermore, the process overlooks lithium extraction from the electrolyte and/or the anode because of complications involved in hydrofluoric acid generation.

The exponential consumption of lithium-ion batteries (LIBs) poses a challenge in the availability of critical resources such as lithium, battery-grade graphite, cobalt etc. in the next decade. An object of the present invention is to provide a green method for the extraction and recovery of critical elements from end-of-life LIBs to meet this challenge.

SUMMARY OF THE INVENTION

Embodiments of the present invention provide an efficient and green method for selective extraction of Li from end-of-life secondary LIBs of any capacity and size. Electrochemical driven selective lithium deposition is targeted to occur at the anode/separator interface of the end-of-life LIBs. The Li concentrated at the anode/separator interface is recovered using an aqueous medium such as distilled water or de-ionized water to extract Li into aqueous solution. Li-containing salts then are recovered from the aqueous solution.

Practice of the method is advantageous in that the method not only enables pre-concentration of plated (deposited) lithium and the recovery of same from the anode/separator interface, but also enables extraction of any lithium from the organic and/or inorganic salts in the solid electrolyte interface (SEI) layer(s) and from the electrolyte in the separator. In addition, cyclable Li is substantially stripped (removed) from the cathode and concentrated at the anode/separator interface by the electrochemical driving action, hence reducing the complexity and cost of subsequent recovery processes for other critical metals like cobalt, etc. from the cathode. After Li recovery from the anode, practice of embodiments of the method also enables the recovery of the battery-grade graphite.

BRIEF DESCRIPTION OF THE DRAWINGS

FIGS. 2a-2d show electrochemical analysis of pouch cells fast charged from 1-6C rates over 10 cycles, where FIG. 2d is DCR vs. cycles.

FIGS. 4a-4d are FE-SEM micrographs with optical images (subplot) of the anode surface with the film deposition, where FIG. 4a) is for pristine anode; FIG. 4b) is after 1C charging, FIG. 4c) is after 3C charging, and FIG. 4d) is after 5C charging.

DETAILED DESCRIPTION OF THE INVENTION

Figure 1:
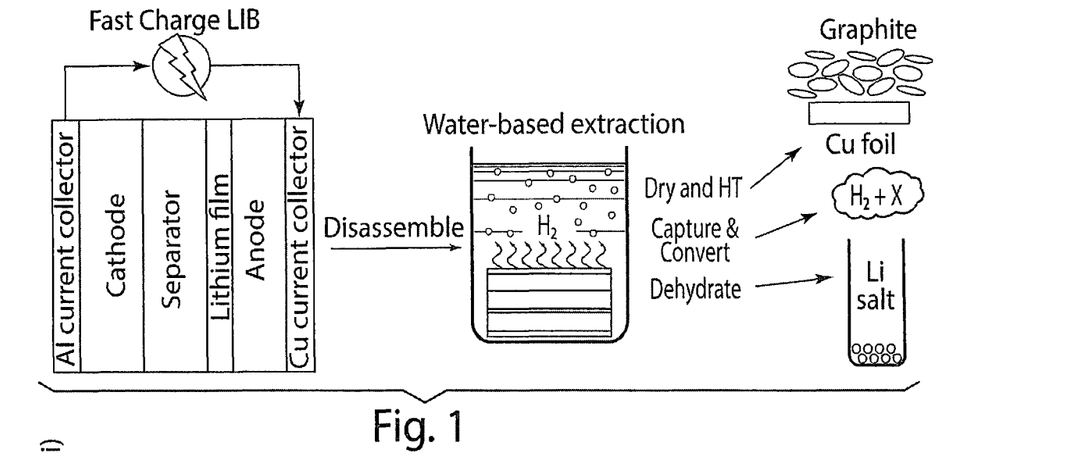
FIG. 1: Schematic of lithium extraction and recovery via. electrochemical deposition.

The anticipated exponential consumption of lithium-ion batteries (LIBs) world-wide poses a unique challenge in the availability of critical resource like lithium in the next decade. In practice of certain embodiments of the present invention, a novel green lithium recovery process is presented which utilizes a battery degradation mechanism, i.e., lithium plating, as a tool to concentrate metallic lithium at the anode/separator interface, wherein the anode/separator interface includes the anode surface and the SEI layer(s) formed on the anode surface adjacent to the separator, FIG. 1.

Certain embodiments of the present invention can be practiced to selectively extract Li from an end-of-life secondary LIBs. End-of-life LIBs are typically considered to be those that typically exhibit over 30%-40% loss in their discharge capacity.

The green recovery method involves as a first step electrochemically driving by charging the end-of-the-life LIB between 1C-rate to 5C-rate over multiple cycles in a manner to achieve selective concentration of Li at the anode/separator interface as deposited primarily as metallic Li and also possibly as oxidized Li from the electrolyte as SEI layer (lithium salt). In addition, cyclable Li is stripped (removed) from the cathode and concentrated as deposited metallic Li and/or oxidized Li (as lithium salt) at the anode/separator interface. Embodiments of the invention envision enhancing deposition of metallic Li by charging an end-of-life LIB without or with a concurrent applied mechanical (e.g. compressive) load and/or at or below ambient room temperature such as less than about 25 degrees C.

Then, a next step involves extracting lithium concentrated at the anode/separator interface using aqueous medium. In particular, the deposited metallic Li and any oxidized Li is extracted into an aqueous medium, such as distilled or de-ionized water. For extraction, the battery casing is removed and the remaining battery components including the anode, separator, and cathode are contacted with the aqueous medium, for example, by submerging the components in the distilled or de-ionized water. In certain embodiments, the anode and separator are separated from the cathode before contacting in respective aqueous medium.

Then, one or more Li-containing salts are recovered from the aqueous solution. In certain embodiments, the Li-containing salts are recovered from aqueous solution by drying (e.g. heating) the aqueous solution, by convective evaporation or otherwise to precipitate the salts.

The recovered salts can include, but are not limited to, LiOH, $Li_2O$, $Li_2CO_3$, LiF, $Li_3PO_4$, and $LiOPF_4$ for the pouch battery described in the Example below and will depend upon battery materials employed.

In certain experimental embodiments leading to development of the present invention, electrochemical characterization of fast charged (1C-6C-rates) end-of-life LIBs was conducted and yielded a maximum capacity fade of 50% by the end of ten cycles. The lithium plating was confirmed via voltage plateau analysis, coulombic efficiency, and DC resistance measurements. A maximum lithium plating condition was observed to exist between 4C and 5C-rates, thereby limiting the energy consumption in the extraction process. Post-mortem Li film-type deposit thickness measurement showed an incrementing deposit thickness with a maximum of 35 μm thickness. SEM and XPS analysis confirmed increasing concentration of a dense dendritic metallic lithium deposit at the anode/separator interface with C-rate.

In other experimental embodiments in which fast charging (1C-6C-rates) was performed under applied mechanical load described herebelow, a maximum capacity fade of 39% was observed at 4C charging rate. In still other experimental embodiments in which fast charging (1C-6C rates) was performed at a temperature below ambient room temperature sans mechanical load, a maximum capacity fade of 60% was observed at −9 degrees Celsius.

An illustrative green recovery process to extract the concentrated metallic lithium used only distilled or de-ionized water. The lithium from the plated (deposited) film, SEI layer(s), electrolyte, anode, and cathode, was extracted from aqueous solution as Li-containing salts. A maximum 40% improvement in lithium recoverability was achieved with fast charging. XPS and ICP-OES analysis showed about 92% lithium yield with no residual lithium in the graphite. Finally, battery grade graphite of greater than 96% purity was recovered from the washed anode after drying and heating at 1000 degrees C. Therefore, practice of embodiments of the invention provides a unique method to extract at least 90% by weight of the original lithium as salt(s) from end-of-life LIBs. Moreover, practice of the embodiments can concentrate and recover battery-grade graphite as well as provide an extracted cathode containing critical transitions metals that can be converted to constituent salts by conventional and convenient techniques.

Example

Electrochemical Analysis

Lithium cobalt oxide (LCO)/graphite (C) pouch cells (20 mAh, Powerstream Inc.) were cycled using MTI BST300 8-channel battery charging station. Some cells were cycled without applied mechanical pressure and other cells were cycled with applied mechanical pressure. Also, some cells were cycled at room temperature (RT) without applied mechanical pressure and other cells were cycled at sub-ambient RT down to −18 degrees C. without applied mechanical pressure.

Some pouch cells were first discharged to 3.0V at RT at a constant current (CC) of C/20 charging rate without mechanical pressure. Some pouch cells were discharged to 3.0V at RT at a CC of C/10 charging rate with applied mechanical pressure. Other pouch cells were first discharged to 3.0V at sub-RT at a constant current (CC) of C/20 charging rate without mechanical pressure.

A rest period of 30 minutes was introduced after every charge and discharge step to stabilize the electrochemical interactions within the electrodes.

In the first cycle, some cells were charged to 90% SOC at RT at C/20 rate without mechanical pressure and some at C/10 rate (CC) with mechanical pressure. Some other cells were charged to 90% SOC at sub-RT at C/20 rate (CC). In all instances, this charging was followed by a discharge of respective cells to 3.0V at C/20 rate (CC) without mechanical pressure, at C/10 rate (CC) with mechanical pressure; and at C/20 rate (CC) at sub-RT.

Proceeding from the slow cycle, fast charging was performed at desired C-rate (1-6C) until 4.2 V, followed by a constant voltage (CV) until approximately 90% SOC. The cells were then discharged at C/2 rate (CC) until 3.0V. The fast charging was repeated over 10 cycles. Finally, the pouch cells were fully discharged until 2.7V at 0.4C rate (CC) and followed by a CV at C/20 rate for cells cycled without mechanical pressure; or C/10 rate for cells cycled with mechanical pressure; and at C/20 rate for cells cycled at sub-RT prior to being dismantled.

Post-Mortem Analysis

The pouch cells were fully discharged to 2.7V and immediately transferred into a MBraun glovebox (<0.1 ppm of $H_2O$ and $O_2$). The cell casing was removed, and the jelly roll was carefully unfolded to avoid damaging the film deposited on the anode/separator interface. The film thickness measurements were performed using a Mitutoyo digital micrometer (Series 293 MDC-MX). The SEM/EDX was performed on the anode surface with a FEI Teneo field emission scanning electron microscope. The samples were transferred using a vacuum transporter to avoid surface oxidation of the deposited lithium film.

Lithium Recovery and Characterization

The anode/separator and cathode were separately stored in separate vials and transferred out of the glovebox. The samples were immediately introduced to 5 mL of distilled water (large excess) under a fumehood and allowed to react for 3 h. Afterwards, the solids were carefully extracted from the solution and dried at 80° C. overnight. The solution was centrifuged for 10 mins to precipitate any insoluble electrode contamination. The pH and conductivity of the solution was measured at room temperature. Finally, the solution was dried for 48 h at 80° C. to recover dried Li-containing salts. The dried anode was mechanically shaken to liberate the graphite from the copper foil. The dried lithium salt, graphite and cathode film were analyzed using XPS (Kratos Analytical, AMICUS XPS).

Results (With No Mechanical Load and at Room Temperature (RT):

Results indicate that fast charging of LIBs induces a large lithium flux on the anode/separator interface. The large ionic flux causes a considerable spike in the lithium-ion concentration on the anode surface, plummeting the anodic potential below 0V (vs. $Li_x/Li$). Under such circumstances, the anodic potential range becomes thermodynamically favorable for metallic lithium to deposit over the anode particles. This phenomenon is commonly known as lithium plating. After the charging period, the anodic potential becomes positive causing the metallic lithium to begin stripping off into the electrolyte in its ionic form. The stripped lithium ions either reversibly intercalate into the anode, causing a plateau in the relaxation voltage profile, or irreversibly react with the solvent in the electrolyte to form an SEI layer over the deposited metallic lithium. A considerable fraction of the metallic lithium is fixed at the anode/separator interface as dead lithium due to the formation of an passivation film during the stripping process.

Figure 2A:
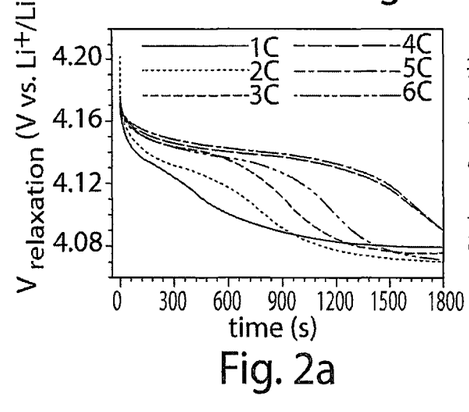
FIG. 2a is Voltage relaxation profile.

The first cycle relaxation voltage analysis of the fast charged pouch cells (1-6C rates) revealed a plateau, inferring the lithium metal stripping (FIG. 2a) after the charging half cycle. The broadening of the voltage plateau indicated an incrementing lithium stripping from 1C to 5C, followed by a depreciation at 6C rate. The maximum lithium plating was found to occur between charging rates 4C rate and 5C rate. For 1C to 3C and 6C, the voltage plateau relaxed completely within the resting period, indicating complete re-intercalation was achieved by the battery during this period. For 4C and 5C, the voltage plateau did not diminish completely indicating incomplete re-intercalation during the rest period.

Figure 2B:
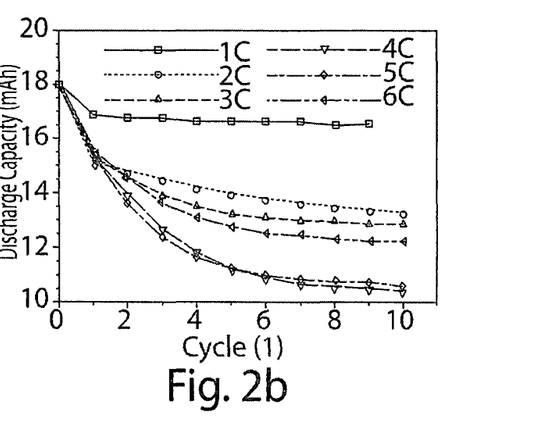
FIG. 2b is Discharge capacity vs. Cycle.

A saturation behavior was observed in the discharge capacity plot over multiple cycles (FIG. 2b). The initial sharp capacity fade provided an indication of rapid lithium leaching from the electrolyte to be deposited as metallic lithium. The saturation of the discharge capacity indicated a suppression of the lithium deposition due to certain mechanism, such as SEI formation over the lithium plating. This mechanism was found to limit the lithium plating at very high C-rates (>5C). At 6C, the reduction in the voltage plateau (FIG. 2a) and the discharge capacity (FIG. 2b) plots suggest a reduced lithium deposition, thereby limiting the current requirements for maximum lithium deposition to 5C. A 50% loss in discharge capacity at 5C indicated half of the cyclable lithium was concentrated onto the interfacial film.

Figure 2C:
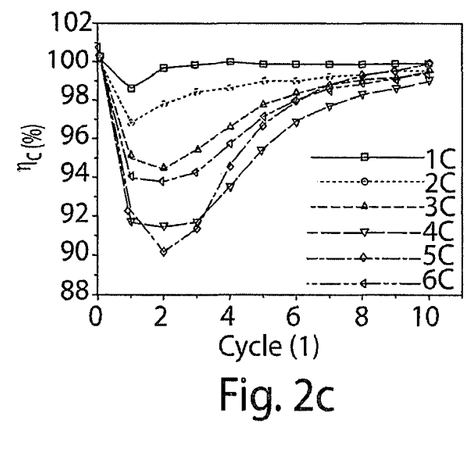
FIG. 2c is Coulombic efficiency vs. Cycles.
Figure 2D:
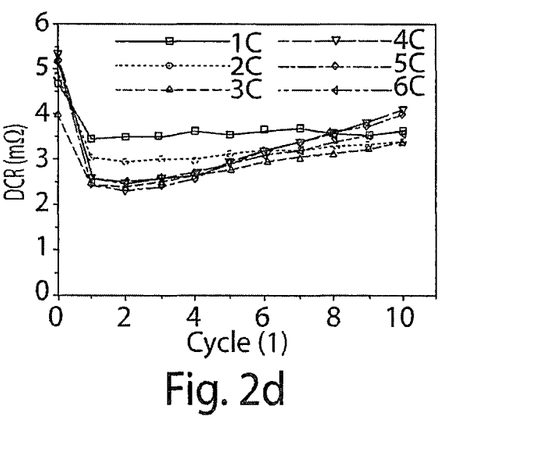

The coulombic efficiency (FIG. 2c) decreased sharply over the formative cycles, supporting the hypothesis of lithium plating from the capacity fade analysis. A rapid increment in the efficiency indicated a saturation in the plating mechanism beyond four operating cycles. A decrease in the first cycle DCR measurements of the pouch cells (FIG. 2d) was also observed, followed by a rise. The decay in the cell resistance attested the deposition of a conductive material within the pouch cell and could be inferred to as lithium plating. The increasing cell resistance beyond the fourth cycle confirms the suppression of lithium plating.

Figure 3:
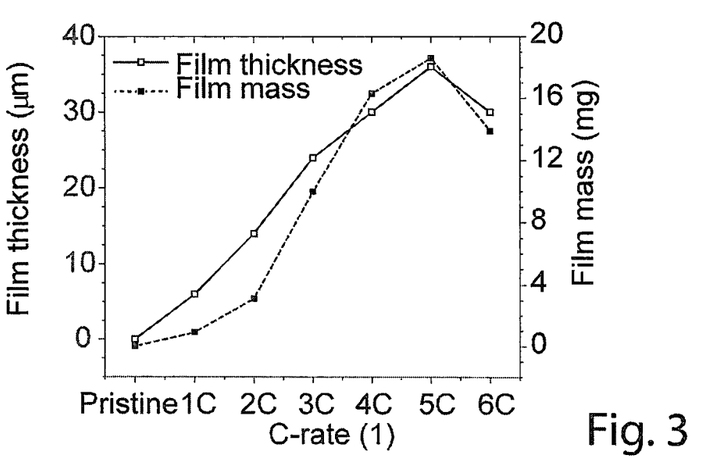
FIG. 3 shows anode film thickness and mass characterization vs. C-rate.

Post-mortem thickness and mass evaluations predicted an increase in Li film deposition until 5C, with a decay in the subsequent cycle (FIG. 3). The film characteristics were determined by considering the thickness of a slow charged (C/20) pouch cell anode as the baseline. The results support the observations from the in-situ electrochemical analysis and predict an optimum operating condition at around 5C rate. An interesting observation was the magnitude of the deposited lithium film in FIG. 3. Former low temperature analysis and modeling efforts have predicted a film thickness in the order of 100-1000 nm. However, a metallic Li film thickness of 10-50 μm strongly improves the extractability of lithium from LIBs.

Figure 4A:
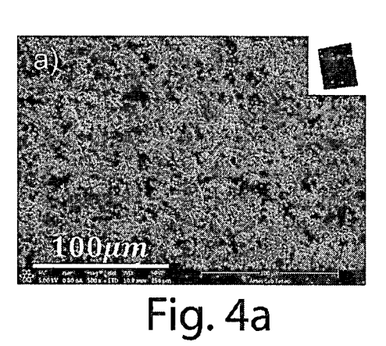
Figure 4B:
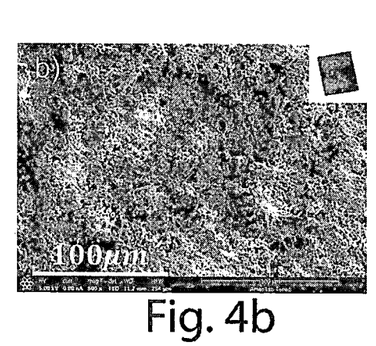
Figure 4C:
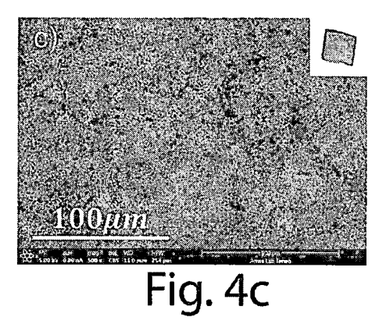
Figure 4D:
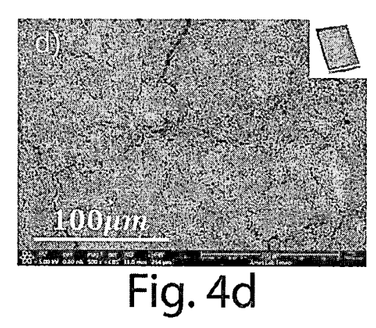
Figure 9:
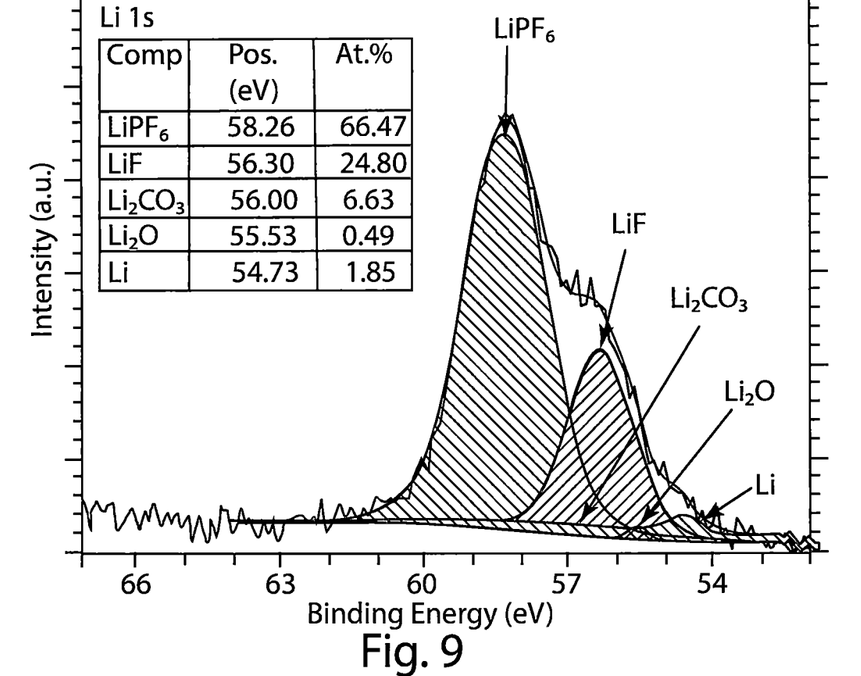
FIG. 9 shows binding energy versus intensity data as well as atomic % constituents for recovered products Li, $Li_2O$, $Li_2CO_3$, LiF, and $LiPF_4$.

To further assess the concept of incrementing lithium deposition on the anode surface at elevated charging rates, FE-SEM analysis was performed on pristine, 1C, 3C and 5C samples (FIGS. 4a-4d). The micrograph of the pristine graphite anode (cycled by C/20-CC) shows an array of exfoliated graphite flakes with indications of a thin SEI film deposition, but with no lithium deposition (FIG. 4a). For the sample cycled at 1C, dendritic depositions were observed to have initiated over the graphite flakes (FIG. 4b). These dendritic depositions were confirmed to be metallic lithium plating by XPS (FIG. 9). A partial coverage of the deposited lithium was found at 1C, with clear visibility of the graphite flakes underneath. With increasing C-rate from 3C to 5C, an exponential increment in dendritic lithium plating was observed (FIG. 4c-4d). At 5C (FIG. 4d), the surface morphology of the anode was completely dominated by metallic lithium whiskers with fault lines associated with film fracture from residual mechanical strain.

The lithium extraction process from the anode and the separator samples was done using distilled water with no acid or base addition (i.e. free of acid/base). The metallic lithium (Li) and the lithium intercalated ($Li_xC_6$, x<1) in the graphite electrode was extracted based on the following chemical reactions.

$$2Li + 2H_2O \rightarrow 2LiOH + H_2 \quad (1)$$

$$Li_xC_6 + xH_2O \rightarrow xLiOH + 6C + x/2H^2 \quad (2)$$

The electrolyte ($LiPF_6$) in the separator would decompose in contact with water to release hydrofluoric acid (HF). The HF would consecutively decompose the SEI layer (Li(R-CHOCO$_2$)).

$$LiPF_6 + H_2 \rightarrow LiOPF_4 + 2HF \quad (3)$$

$$LiPOF_4 + H_2O \leftrightharpoons Li_3PO_4 + Li_x(POF)_y + HF \quad (4)$$

$$2(RCHOCO_2)Li + 2HF \rightarrow 2LiF + (RCHOH)_2 + 2CO_2 \quad (5)$$

The lithium hydroxide (LiOH) thus produced could decompose or get carbonated in contact with atmosphere and the gases evolved from the SEI decomposition.

$$2LiOH \rightarrow Li_2O + H_2O \quad (6)$$

$$2LiOH + CO_2 \rightarrow Li_2CO_3 + H_2O_2 \quad (7)$$

$$LiOH + HF \rightarrow LiF + H_2O_2O \quad (8)$$

Figure 5A:
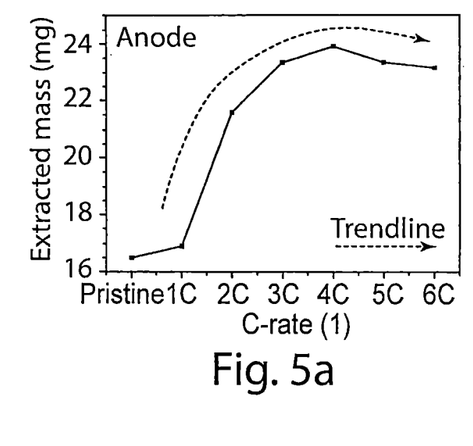
FIGS. 5a-5b are extracted lithium salt gravimetric analysis vs. C-rate, where FIG. 5a) is the anode and FIG. 5b) is the cathode.
Figure 5B:
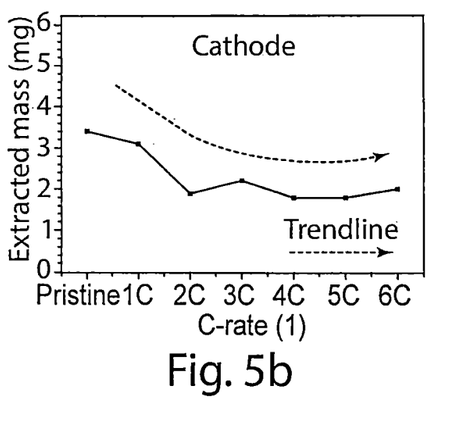
Figure 10:
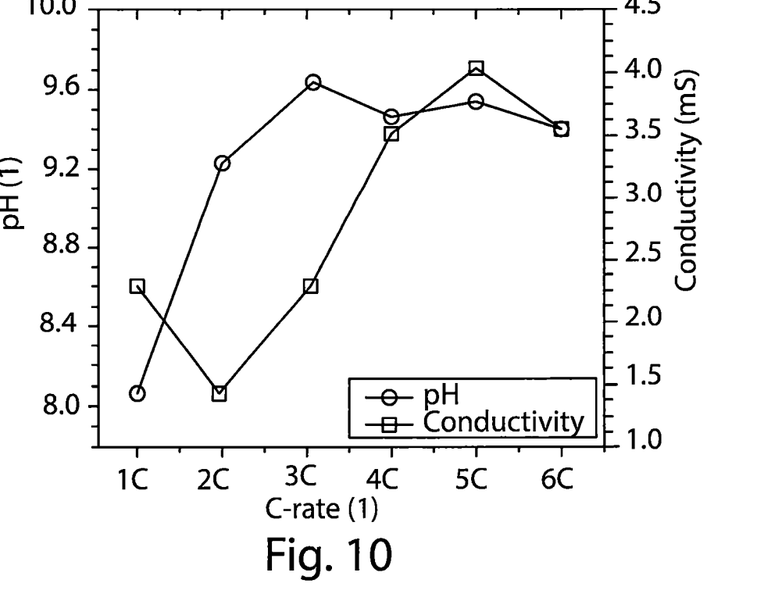
FIG. 10 shows plots of C-rate versus pH and conductivity.

Therefore, the solution produced by adding water to the plated anode and the separator would primarily contain LiOH, $Li_2O$, $Li_2CO_3$, LiF, $Li_3PO_4$, and $LiOPF_4$. The pH and conductivity of the solution were measured (FIG. 10). A similar pattern was observed in the conductivity measurements as the electrochemical analysis (FIGS. 2a-2d), with the solution pH and conductivity was found to increase with C-rates. The oscillations in the conductivity measurement occurred because the extracted solution did not contain only LiOH. Since the SEI and electrolyte decompose along with the plated lithium, consequentially forming other lithium salts. In an ideal situation, only the lithium metal on the anode film would have dissolved in water to yield equivalent LiOH. The variability in the dissociation constants and solubility of the different lithium salts and their by-products introduced the observed deviations in the conductivity measurement. The extracted lithium salts from the anode/separator and cathode batches were weighed after drying (FIG. 5a-5b). An increasing lithium deposition was observed with C-rate in the anode until a maximum (FIG. 5a). This observation confirmed the upper charging limit to be between 4C and 5C for the given lithium pouch cells. A 40% improvement in lithium recoverability was observed for batteries electrochemically cycled at 4C and 5C charging rates compared to a fresh (pristine) battery. With increasing plating, a reduction in the lithium content from the cathode is expected. During the fast charging, the cyclable lithium is lost from the cathode and the electrolyte and deposits on the anode. A corresponding decrease in the lithium extraction was observed in the cathode (FIG. 5b), indicating targeted concentration of metallic lithium at the anode/separator interface.

Figure 6:
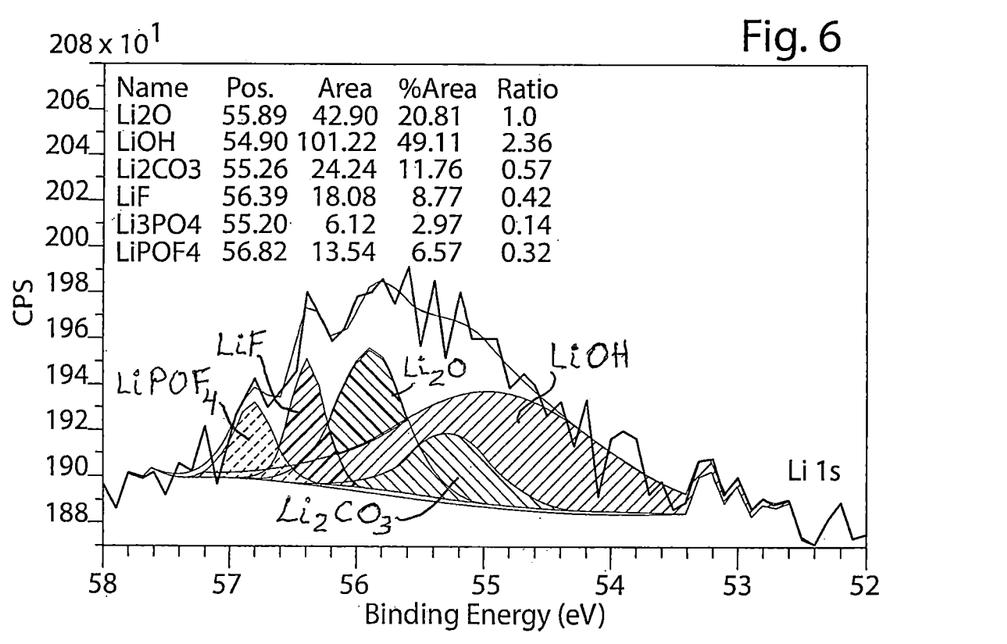
FIG. 6 shows XPS deconvolution of lithium salt from the 5C rate batch.

The lithium salts yielded from the battery were analyzed. The 5C batch of the lithium salt was analyzed using XPS. The lithium peak from the XPS was deconvoluted and fitted with the above-mentioned lithium salts (FIG. 6). The peak areal analysis predicted about 50% of the salt composition was LiOH, followed by $Li_2O$, $Li_2CO_3$, LiF, $LiOPF_4$ and $Li_3PO_4$. This analysis confirmed that most of the lithium was derived from the electrodeposited metallic Li layer. Since the pouch cell was completely discharged prior to disassembly, the contribution of LiOH from the intercalated graphite was assumed to be insignificant. Since the $Li_2O$ and $Li_2CO_3$ were mostly generated as a byproduct of LiOH decomposition, the total metallic lithium contributed >80% of the yield composition. The remainder of the yield were derived either from the SEI or the electrolyte decomposition.

Figure 7:
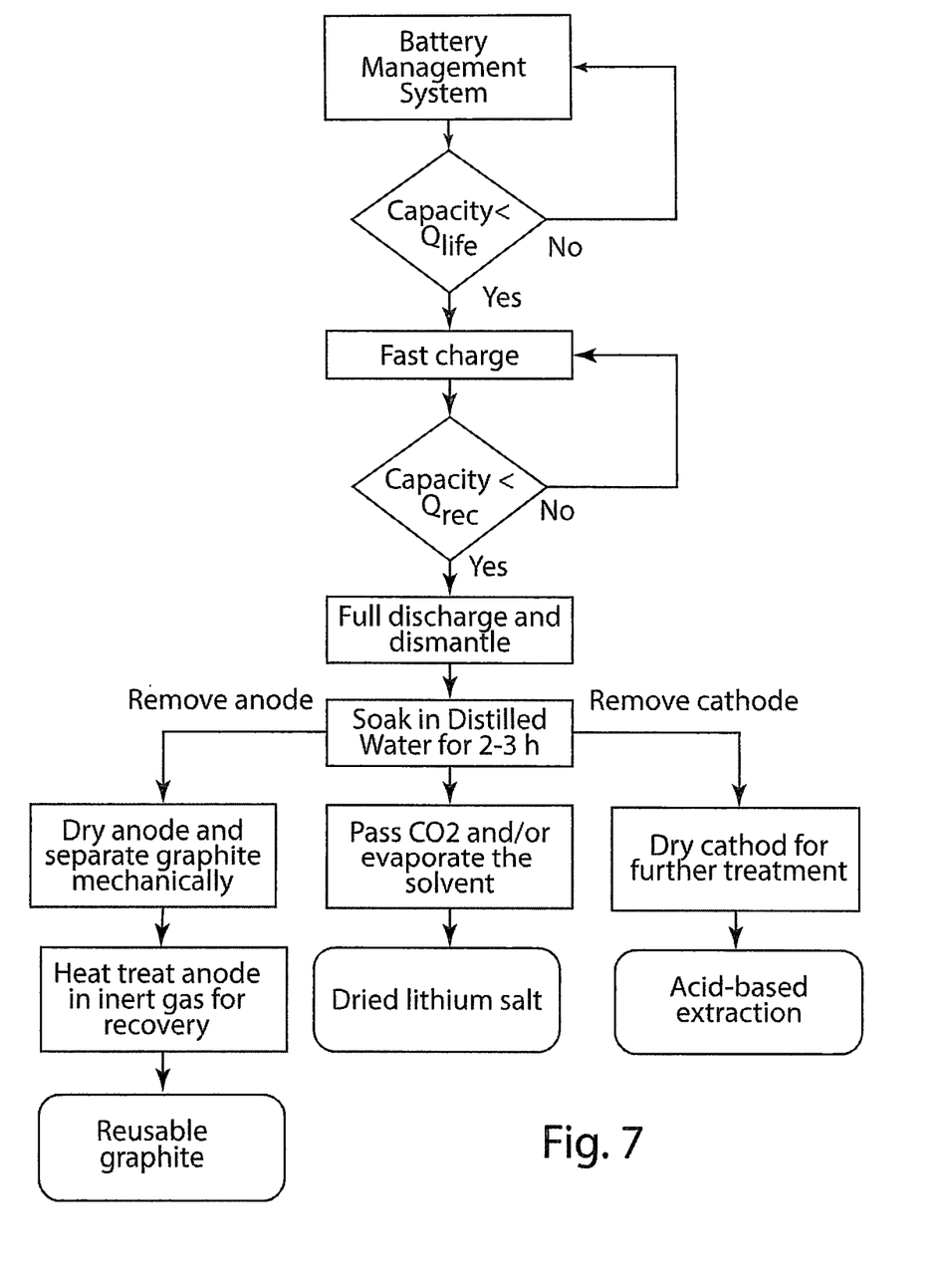
FIG. 7 is flow diagram of lithium recovery from pouch cells using electrochemical lithium deposition technology.

Consequently, the molar concentrations from the XPS data were used to estimate an equivalent lithium extraction from the battery. For an initial yield of 23.3 mg, a molar analysis was performed in Table 1 to evaluate 5.52 mg of lithium in the extracted salt mixture. With a 300 mg/Ah of lithium content in a lithium cobalt oxide battery, the lithium yield from a 20 mAh LCO/C pouch cell equates to about 92% by weight. The flow schematic of the entire process is presented in FIG. 7.

TABLE 1

Molar analysis and equivalent mass prediction of lithium from XPS deconvolution for 5C lithium spectrum.

| Compound | Molar Mass (g/mol) | $x_{Li}$ | Molar Ratio (%) | Mass (mg) | n (mmol) | $m_{Li}$ (mg) |
| --- | --- | --- | --- | --- | --- | --- |
| $Li_2O$ | 29.88 | 2.00 | 20.81 | 3.54 | 0.12 | 1.66 |
| LiOH | 23.95 | 1.00 | 49.11 | 6.70 | 0.28 | 1.96 |
| $Li_2CO_3$ | 73.89 | 2.00 | 11.76 | 4.95 | 0.07 | 0.94 |
| LiF | 25.94 | 1.00 | 8.77 | 1.30 | 0.05 | 0.35 |
| $Li_3PO_4$ | 115.79 | 3.00 | 2.97 | 1.96 | 0.02 | 0.36 |
| $LiOPF_4$ | 129.91 | 1.00 | 6.57 | 4.86 | 0.04 | 0.26 |

Figure 8A:
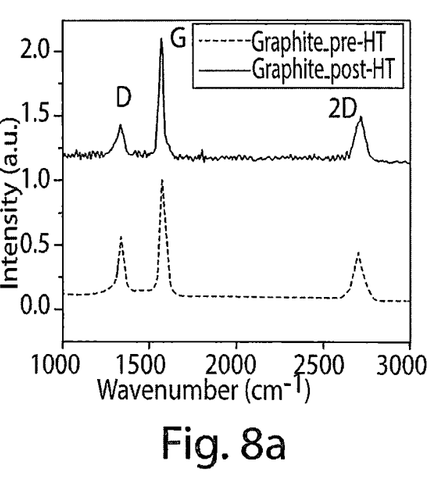
FIGS. 8a-8d show Raman spectra, TGS, DSC and other data for recovered graphite before (pre-HT) and after heat treatment (post-HT).
Figure 8B:
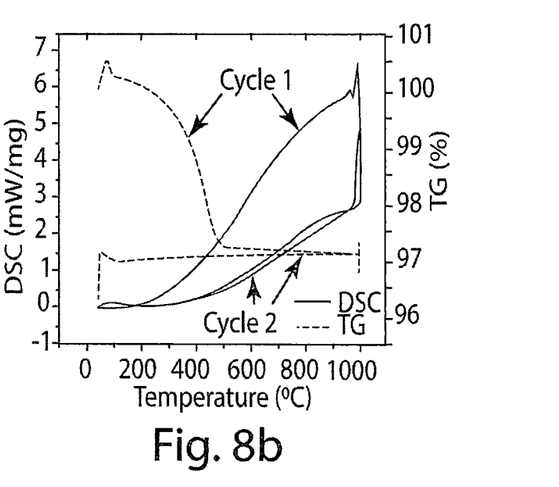
Figure 11:
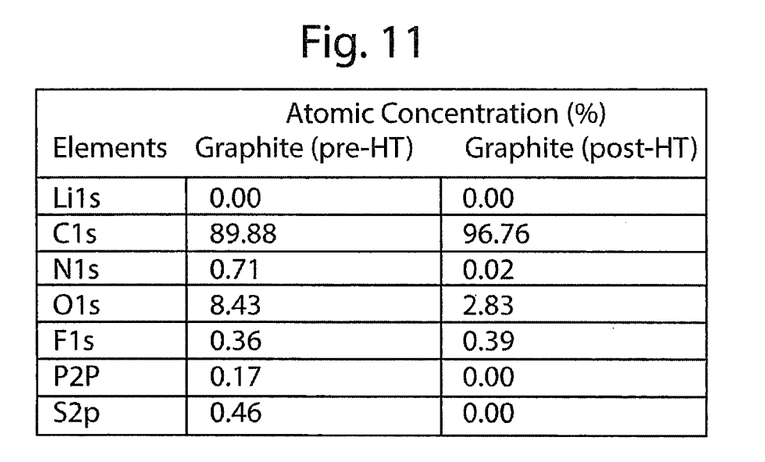
FIG. 11: contains Table S1.

The XPS deconvolution of the washed graphite (after lithium extraction) from the pouch cell revealed no trace of lithium (Table S1 of FIG. 11), indicating a complete lithium recovery from the anode. Moreover, the sample was found to be 89.9% C1s with 10% impurity. The extracted and dried graphite was heat treated (HT) in Ar flow under full vacuum and at 1000° C. A 30% mass loss was observed indicating decomposition of residual hydrocarbons from the filler and binder materials. Post-HT XPS analysis revealed 7.65% improvement in the graphite purity with a C1s of 96.8% and 3.2% of impurity. Raman spectra were obtained from the pre- and post-HT graphite anode samples (FIG. 8a). The disorder peak (D band) was suppressed in the post-HT sample, inferring an increase in the graphitic behavior of the anode, and reduction in the amorphous filler and binding materials. The $I_G/I_D$ ratio increased from 1.79 to 3.13 after the heat treatment process, indicating a 75% increase in the degree of graphitization. The degree of graphitization can be easily further improved by heat treating at higher temperature. In addition, TGA and DSC analyses were performed to evaluate the thermal transitions and mass loss during the HT process of the graphite sample (FIG. 8b). A two-stage mass loss is observed during the first cycle heating, with expected water removal by 300° C. and decomposition of the binding material into carbon by 450° C. The second cycle iteration of the process revealed no significant mass or thermal changes, indicating a stable product with no further thermal decompositions. The HT process can be optimized to enable enhanced extraction of graphite.

Figure 8C:
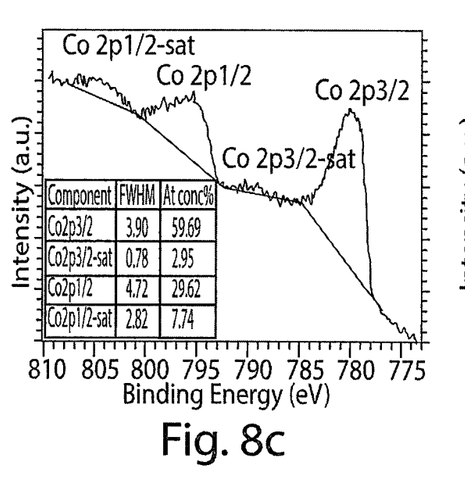
Figure 8D:
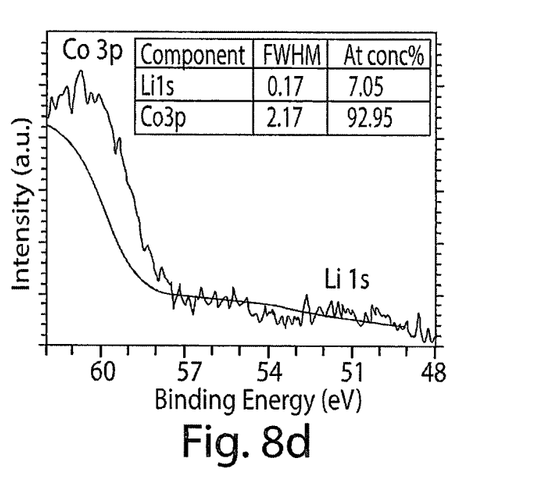
Figure 12:
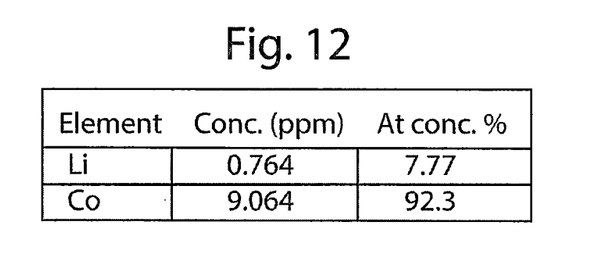
FIG. 12: contains Table S2.

The XPS deconvolution of the Co2p spectrum of the washed and dried cathode film was performed based on former XPS measurements of $Li_xCoO_2$ electrodes at different states of charge (references. 37,38). The results, shown in FIG. 8c, indicated <10 atomic (at.) % (or <0.7 wt. %) of lithium. The deconvolution of the Li1s and Co3p peaks (FIG. 8d) predicted 7.05 at. % of Li in $CoO_2$ structure (Table S2). Compositional analysis of the same electrode was performed with Inductively Coupled Plasma Optical Emission Spectroscopy (ICP-OES) and revealed 7.77 at. % Li and the rest 92.95 at. % of Co (Table S2 of FIG. 12). These results agree within 1% of the amounts estimated from the XPS spectrum deconvolution. The XPS analysis of extracted Li (FIG. 6b and Table 1) showed 92.2 at. % recovery. The remaining 7.8 at. % of Li is present in material extracted from cathode as shown by XPS and ICP-OES. Therefore, for simple cathode chemistries, like lithium salts of cobalt oxide, manganese oxide and ferrous phosphate, the extraction process yields 93 at. % pure metal salt.

The $H_2$ evolution during the extraction process could be utilized as an energy source in the recovery process. The $H_2$ gas could be collected and combusted to dry the lithium solution and/or heat treat the graphite extractant for purification. From the predicted deposition of about 4.42 mg (or 0.63 mmol) of lithium metal dendrites (assuming 80% of the yield is from lithium plating), a rudimentary thermodynamic energy balance yields 149 J of heat from the hydrolysis of lithium and 90 J of energy upon combustion of the generated $H_2$. Therefore, a total thermal generation of 239 J. Assuming 5 times excess (molar-basis) of $H_2O$ used in the extraction process, the energy required to boil the water from 25° C., is equivalent to 146 J. Therefore, the $H_2$ could be used as a clean fuel to support the recovery process.

Results (With Mechanical Load or at Sub-Ambient Room Temperature):

The experimental embodiments in which fast charging (1C-6C rates) was performed under applied mechanical (compressive) load produced a maximum capacity fade of 39% which was observed at 440 kPa when tested at RT over a load range of 0 kPa to 440 kPa. A compressive load was applied by placing an individual pouch cell between a bottom plate that was located on a rigid stage and a top plate having compression load cell thereon with a compressive force being applied normal (perpendicular) to the side of the pouch cell by displacement of the top plate/compression load cell.

The other experimental embodiments, in which fast charging (1C-6C rates) was performed at a temperature below ambient room temperature (sans mechanical load), produced a maximum capacity fade a maximum capacity fade of 60% which was observed at −9 degrees C. when tested over a temperature range of RT to −18 degrees Celsius. The sub-RT was obtained by placing the pouch cell in a Peltier cooling platform.

In summary, an advantageous lithium extraction method is presented which utilizes the degradation mechanisms from fast charging lithium battery, i.e., lithium plating, as a tool to selectively concentrate metallic lithium at the anode/separator interface. In-situ electrochemical analysis predicted an increasing lithium deposition with charging rate up to 5C followed by a decay. The film characterization during post-mortem analysis revealed a maximum film thickness of 35 um with increasing lithium spatial deposition with C-rate. A green recovery method is employed by which the lithium from the plated film, SEI, and electrolyte were extracted using only distilled water with no addition of acid or base. A 40% gain in lithium recoverability was observed between the lithium harvested from the fast charging and pristine electrodes. XPS and ICP-OES analysis of the extracted lithium salt predicted >80% of the lithium was derived from the dendritic film, with a total extraction efficiency of >90% at 5C. No traceable lithium was found in the anode and <8 at. % of lithium was found in the cathode. Thus, the practice of the invention can be deployed to any scale of lithium battery for recovery of lithium and graphite, while concentrating the transition metal in the cathode for downstream processing.

Although certain embodiments of the invention have been described above for purposes of illustration, those skilled in the art will appreciate that changes can be made therein within the scope of the invention as set forth in the appended claims.

We claim:

1. A recycling method for selective extraction of lithium from a lithium ion battery which has an anode, a cathode, and a separator in a battery casing, comprising the steps of:
electrochemically driving lithium to selectively concentrate Li lithium by electrochemical lithium plating at an anode/separator interface of the lithium ion battery,
contacting at least the anode and the separator with an aqueous medium after the battery casing is opened or removed to dissolve the lithium concentrated at the anode/separator interface into aqueous solution, and
recovering one or more lithium-containing salts from the aqueous solution.

2. The method of claim 1 wherein the anode/separator interface includes an anode surface and adjacent SEI layer(s) at the anode/separator interface between the anode surface and the separator so that metallic lithium plating is dissolved into aqueous solution.

3. The method of claim 1 wherein lithium from inorganic salts and/or organic salts of SEI layer(s) and from electrolyte in the separator is dissolved in aqueous solution.

4. The method of claim 1 wherein the electrochemically driving strips cyclable lithium from the cathode and concentrates it at the anode/separator interface.

5. The method of claim 1 wherein the electrochemically driving occurs by charging the lithium ion battery at a charging rate of 1C to 5C.

6. The method of claim 1 wherein the battery casing is opened or removed and the anode, the separator, and the cathode are contacted with the aqueous medium.

7. The method of claim 6 wherein insoluble metallic battery components including metallic current collectors are recovered from the aqueous solution.

8. The method of claim 1 wherein the battery casing is opened or removed and then the anode and separator are separated from the cathode and contacted with the aqueous medium.

9. The method of claim 8 wherein the cathode is separated and contacted with the aqueous medium.

10. The method of claim 1 wherein the aqueous medium comprises distilled water or de-ionized water.

11. The method of claim 1 including the further step of recovering graphite of the anode from the aqueous solution.

12. The method of claim 11 that includes separating the graphite from metallic anode substrate.

13. The method of claim 1 which is conducted while applying a mechanical compressive load to the lithium battery.

14. The method of claim 1 which is conducted at a sub-ambient temperature.

15. The method of claim 14 wherein the sub-ambient temperature is about 25 degrees C. or less.

16. The method of claim 1 wherein the anode, separator, and/or cathode are submerged in the aqueous medium.

\* \* \* \* \*